United States Patent
Syssoev et al.

(10) Patent No.: US 9,926,919 B2
(45) Date of Patent: Mar. 27, 2018

(54) CRYOPUMP

(71) Applicant: Brooks Automation, Inc., Chelmsford, MA (US)

(72) Inventors: Sergei Syssoev, Townsend, MA (US); Allen J. Bartlett, Uxbridge, MA (US); John J. Casello, Norton, MA (US); Jeffrey A. Wells, Milford, NH (US); Michael J. Eacobacci, Jr., South Attleboro, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 33 days.

(21) Appl. No.: 15/012,399

(22) Filed: Feb. 1, 2016

(65) Prior Publication Data
US 2016/0146200 A1 May 26, 2016

Related U.S. Application Data

(62) Division of application No. 13/983,973, filed as application No. PCT/US2012/024243 on Feb. 8, 2012, now Pat. No. 9,266,038.

(60) Provisional application No. 61/441,027, filed on Feb. 9, 2011.

(51) Int. Cl.
*F04B 37/08* (2006.01)
*B01D 8/00* (2006.01)

(52) U.S. Cl.
CPC .............. *F04B 37/08* (2013.01); *B01D 8/00* (2013.01); *Y10T 29/49236* (2015.01)

(58) Field of Classification Search
CPC .......... B01D 8/00; F24B 37/08; F24F 3/1423; F24F 3/1429; F24F 2203/1032; F24F 2203/1068; F25D 17/06
USPC .................................................. 62/55.5, 268
See application file for complete search history.

(56) References Cited

U.S. PATENT DOCUMENTS

| | | | |
|---|---|---|---|
| 3,769,806 A | 11/1973 | Boissin et al. | |
| 4,212,170 A | 7/1980 | Winkler | |
| 4,311,018 A | 1/1982 | Welch | |
| 4,356,701 A * | 11/1982 | Bartlett | F04B 37/08 165/104.21 |

(Continued)

FOREIGN PATENT DOCUMENTS

| | | |
|---|---|---|
| DE | 32 16 591 A1 | 11/1983 |
| GB | 1 531 378 A | 11/1978 |

(Continued)

OTHER PUBLICATIONS

International Preliminary Report on Patentability for International Application No. PCT/US2012/024243 filed Feb. 8, 2012.

(Continued)

*Primary Examiner* — Mohammad M Ali
(74) *Attorney, Agent, or Firm* — Hamilton, Brook, Smith & Reynolds, P.C.

(57) ABSTRACT

A cryopump has a simple-to-manufacture frontal baffle plate with improved gas distribution and has a large-area second-stage array plate to capture Type II gases. The cryopump has a first-stage frontal baffle plate having orifices and flaps bent from and attached to the orifices. The cryopump has a second-stage top plate that is larger in area than cooling baffles of the second stage array.

18 Claims, 11 Drawing Sheets

(56) References Cited

U.S. PATENT DOCUMENTS

| | | | |
|---|---|---|---|
| 4,449,373 A | | 5/1984 | Peterson et al. |
| 4,494,381 A | | 1/1985 | Lessard |
| 4,555,907 A | * | 12/1985 | Bartlett .............. F04B 37/08 417/901 |
| 4,718,241 A | * | 1/1988 | Lessard .............. F04B 37/08 417/901 |
| 4,785,666 A | | 11/1988 | Bergq |
| 4,896,511 A | † | 1/1990 | Lessard |
| 5,111,667 A | | 5/1992 | Hafner et al. |
| 5,211,022 A | * | 5/1993 | Bartlett .............. F04B 37/08 417/901 |
| 5,301,511 A | | 4/1994 | Bartlett et al. |
| 5,782,096 A | * | 7/1998 | Bartlett .............. F04B 37/08 417/901 |
| 5,855,118 A | * | 1/1999 | Lorimer .............. F04B 37/02 417/901 |
| 6,327,863 B1 | | 12/2001 | Yamartino et al. |
| 7,313,922 B2 | | 1/2008 | Bartlett et al. |
| 9,266,038 B2 | | 2/2016 | Syssoev et al. |
| 2005/0155358 A1 | * | 7/2005 | Ash .............. F04B 37/08 62/55.5 |
| 2005/0262852 A1 | | 12/2005 | Amundsen et al. |
| 2007/0144185 A1 | * | 6/2007 | Tanaka .............. F04B 37/08 62/55.5 |
| 2007/0283704 A1 | * | 12/2007 | Tanaka .............. F04B 37/08 62/55.5 |
| 2007/0295599 A1 | | 12/2007 | Tsuyuki |
| 2008/0168778 A1 | | 7/2008 | Bartlett et al. |
| 2009/0007574 A1 | | 1/2009 | Amundsen et al. |
| 2009/0038319 A1 | | 2/2009 | Tsuyuki |
| 2009/0165469 A1 | | 2/2009 | Matsubara |
| 2009/0282841 A1 | | 11/2009 | Tanaka |
| 2009/0282842 A1 | | 11/2009 | Koyama |
| 2010/0000235 A1 | | 1/2010 | Tanka |
| 2010/0077771 A1 | | 4/2010 | Tanak |
| 2010/0104760 A1 | * | 4/2010 | Matsui .............. C23C 16/4401 427/294 |

FOREIGN PATENT DOCUMENTS

| | | |
|---|---|---|
| GB | 2 061 391 A | 5/1981 |
| JP | 58-124679 | 8/1983 |
| JP | 62-051777 A | 3/1987 |
| JP | 63-112282 U | 5/1988 |
| JP | 63-501585 A | 6/1988 |
| JP | 02-502034 A | 7/1990 |
| JP | 05-044642 | 2/1993 |
| JP | 2008-297927 | 12/2008 |
| JP | 2010-084702 A | 4/2010 |
| TW | 200902848 A | 1/2009 |
| TW | 200924336 A | 6/2009 |
| WO | WO 2012/109304 | 8/2012 |

OTHER PUBLICATIONS

Translation of DE 32216591 to Hans et al of dated Nov. 10, 1983.
English Translation of Third Party Submission of Information, Dated May 24, 2017, JP. Application No. 2016-207558, 3 pages.
Tingwei, X. et al., "Calculations of Pumping Coefficients for Cryopumps Using a Combined Oatley-Monte Carlo Method," *Vacuum,* 39(6):543-546 (1989).
English Translation of Notification of Reason(s) for Rejection issued in Japanese Application No. 2013-553508, entitled "Cryopump," Date of Service: Dec. 22, 2015 (3 pages).
International Search Report and Written Opinion issued in International Application No. PCT/US2012/024243, entitled "Cryopump," dated Sep. 26, 2012.
English Translation of Search Report issued in Taiwan Application 101104149, entitled "Cryopump," Date of Search: Oct. 2, 2015.
Xu Tingwei et al., "Calculations of pumping coefficients for cryopumps using a combined Oatley-Monte Carlo method," 3 pages, 1989, Pergamon Press plc, Great Britain.†

* cited by examiner
† cited by third party

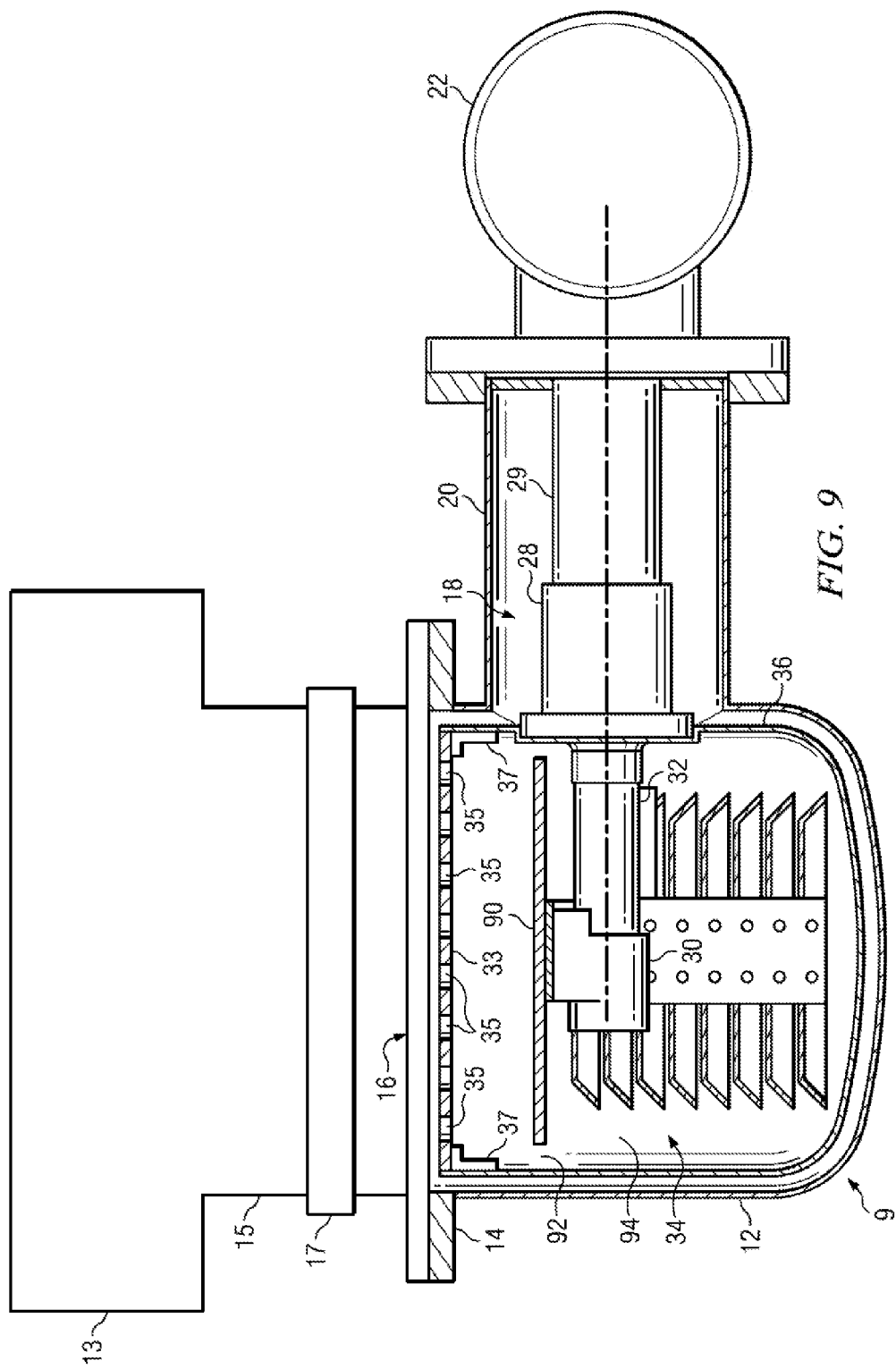

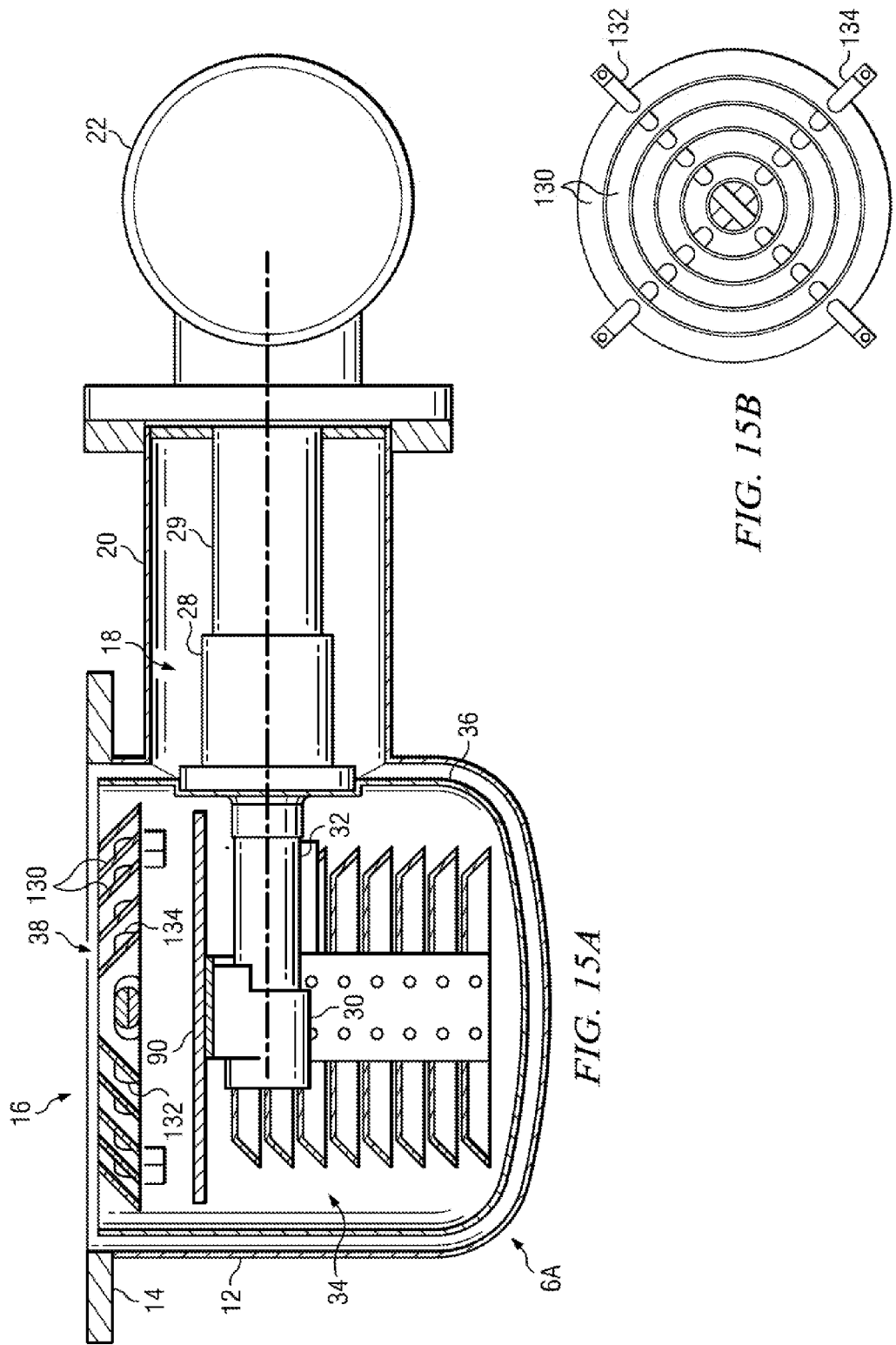

CRYOPUMP

RELATED APPLICATION

This application is a divisional of U.S. application Ser. No. 13/983,973, filed Aug. 6, 2013, which is the U.S. National Stage of International Application No. PCT/US2012/024243, filed Feb. 8, 2012, which designates the U.S., published in English, and claims the benefit of U.S. Provisional Application No. 61/441,027, filed on Feb. 9, 2011.

The entire teachings of the above application are incorporated herein by reference.

BACKGROUND OF THE INVENTION

Cryopumps currently available, whether cooled by open or closed cryogenic cycles, generally follow the same design concept. A low temperature second stage cryopanel array, usually operating in the range of 4-25 K, is a primary pumping surface. This surface is surrounded by a high temperature radiation shield usually operated in the temperature range of 40-130 K, which provides radiation shielding to the lower temperature array. The radiation shield generally comprises a housing which is closed except at a frontal cryopanel array positioned between the primary pumping surface and the chamber to be evacuated. This higher temperature, first stage, frontal array serves as a pumping site for high boiling point gases such as water vapor, known as Type I gases.

In operation, high boiling point gases such as water vapor are condensed on the frontal array. Lower boiling point gases pass through the frontal array and into the volume within the radiation shield. Type II gases, such as nitrogen, condense on the second stage array. Type III gases, such as hydrogen, helium and neon, have appreciable vapor pressures at 4K. To capture Type III gases, inner surfaces of the second stage array may be coated with an adsorbent such as activated carbon, zeolite or a molecular sieve. Adsorption is a process whereby gases are physically captured by a material held at cryogenic temperatures and thereby removed from the environment. With the gases thus condensed or adsorbed onto the pumping surfaces, only a vacuum remains in the work chamber.

In cryopump systems cooled by closed cycle coolers, the cooler is typically a two stage refrigerator having a cold finger which extends through the radiation shield. The cold end of the second, coldest stage of the refrigerator is at the tip of the cold finger. The primary pumping surface, or cryopanel, is connected to a heat sink at the coldest end of the second stage of the cold finger. This cryopanel may be a simple metal plate, a cup or an array of metal baffles arranged around and connected to the second stage heat sink as, for example, in U.S. Pat. Nos. 4,555,907 and 4,494,381, which are incorporated herein by reference. This second stage cryopanel may also support low temperature condensing gas adsorbents such as activated carbon or zeolite as previously stated.

The refrigerator cold finger may extend through the base of a cup-like radiation shield and be concentric with the shield. In other systems, the cold finger extends through the side of the radiation shield. Such a configuration at times better fits the space available for placement of the cryopump.

The radiation shield is connected to a heat sink, or heat station, at the coldest end of the first stage of the refrigerator. This shield surrounds the second stage cryopanel in such a way as to protect it from radiant heat. The frontal array which closes the radiation shield is cooled by the first stage heat sink through the shield or, as disclosed in U.S. Pat. No. 4,356,701, which is incorporated herein by reference, through thermal struts.

Cryopumps need to be regenerated from time to time after large amounts of gas have been collected. Regeneration is a process wherein gases previously captured by the cryopump are released. Regeneration is usually accomplished by allowing the cryopump to return to ambient temperatures and the gases are then removed from the cryopump by means of a secondary pump. Following this release and removal of gas, the cryopump is turned back on and after re-cooling is again capable of removing large amounts of gas from a work chamber.

A figure of merit of cryopumps is the capture probability of hydrogen, the probability that a molecule of hydrogen that reaches the open mouth of the cryopump from outside of the pump will be captured on the second stage of the array. The capture probability directly relates to the speed of the pump for hydrogen, the liters per second captured by the pump. Higher rate pumps of conventional design have a capture probability of hydrogen of 20% or greater.

Various pump designs have been proposed to increase the pumping speed of Type III gases. For example, U.S. Pat. No. 4,718,241, which is incorporated herein by reference, presents a second stage array designed to increase the speed for pumping the non-condensable gases, while at the same time limiting the frequency of regeneration of the system. It accomplishes this by opening up the second stage cryopanel to allow greater accessibility of the noncondensing gases, such as hydrogen, neon, or helium, to the adsorbent material which has been placed on the interior surfaces of the discs of the cryopanel. This allows the noncondensing gases to be adsorbed more quickly, thus increasing the pumping speed for the non-condensables. At the same time, the second stage array was designed so as to assure that all of the gas molecules first strike a surface of the cryopanel which has not been coated with an adsorbent material.

Other pump designs, such as the pump described in U.S. Pat. No. 5,211,022, which is incorporated herein by reference, replace the chevrons or louvers of the first stage with a plate having multiple orifices. The orifices restrict the flow of gases to the second stage compared to the chevrons or louvers. By restricting flow to the inner second stage pumping area, a percentage of inert gases are allowed to remain in the working space to provide a moderate pressure (typically $10^{-3}$ Torr or greater) of inert gas for optimal sputtering. However, higher condensing temperature gases, such as water are promptly removed from the environment by condensation on the frontal orifice plate.

The practice of the prior art has been to protect the second stage with chevrons and sputter plates to reduce radiant heat from striking the second stage, to control Type II and III gas flow rates to the second stage, and to prevent Type I, higher boiling point, condensing gases from condensing on the colder surfaces and adsorbent layer. The reduction in radiation and flow rates lowers the temperature of the second stage cryopanel surfaces and the condensed gases on these surfaces as well as the adsorbent. The lower temperature results in an increased gas capture capacity and reduces the frequency of regeneration cycles. The chevrons provide very good radiation shielding as compared to the sputter plates, which contain orifices that provide direct line of sight of the radiant heat to the second stage cryopanel surfaces. However, the current state of the art sputter plates severely restrict Type II and Type III gases to the second stage cryopanels compared to the chevrons, which results in lower pumping speeds for these gases. In some applications, this severe restriction of pumping speed is preferred because a percentage of inert gases are allowed to remain in the working space of the process chamber to provide a moderate pressure of inert gas for optimal sputtering or other processing.

SUMMARY OF THE INVENTION

There is market demand for a cryopump having a simple-to-manufacture first-stage baffle plate offering improved radiation blocking with limited gas flow rates through the baffle plate and a second stage array that can carry an increased amount of condensed gases. A simple-to-manufacture first-stage baffle plate has orifices with flaps bent at an angle and attached at edges of the orifices. A second stage array uses a top plate, which is larger in area than the baffles of the second stage array. A cryopump may use each of the simple-to-manufacture first-stage baffle plate and the large-area top plate alone or in combination.

As noted, a cryopump may comprise a first stage frontal baffle plate arranged in an opening of the cryopump. The frontal baffle plate has an area that substantially covers the opening of the cryopump. The frontal baffle plate has a plurality of orifices, each orifice having a flap that is bent from and attached to the frontal baffle plate at an edge of the orifice, and each flap is arranged in a path that passes through the frontal baffle plate. The orifices may be rectangle shaped, square shaped, trapezoid shaped, circle shaped, triangle shaped, or any other shape. The flaps are preferably bent at an angle between 10° and 60° relative to the surface of the frontal baffle plate, and most preferably are bent at an angle between 25° and 35°. For greater speed but higher heat load on the second stage, angles of 35-45° are preferred.

The simple-to-manufacture frontal baffle plate may be formed by first providing a metal plate. A plurality of orifices are created in the circular metal plate, and at least a portion of the metal from the plate from each orifice (a flap) remains attached to the plate at an edge of the orifice. The portion of metal is then bent about the edge to an angle relative to the surface of the metal plate. The orifice may be rectangle shaped, square shaped, circle shaped, trapezoid shaped, or triangle shaped, or any other shape. The flap at each orifice may be attached to an edge of its respective orifice that is closest to the center of the frontal baffle plate. The orifices may be arranged on the frontal baffle plate such that there is at least one path from the center of the plate to an edge of the plate that has no orifices. The orifices may, for example, be created by at least one of laser cutting, water jet cutting, mechanical cutting, etching, and stamping.

Advantages of a cryopump having the frontal baffle plates described herein include simplicity of manufacturing and improved blocking of radiation from a process chamber to which the cryopump is attached. Another advantage of a cryopump having the frontal baffle plates described herein is improved distribution of the Type II gases and Type III gases at the second stage array of the cryopump.

Optionally, the cryopump may have a second stage array that has a plurality of cooling baffles having a first projected area (from a view point looking into the cryopump through the opening to the process chamber), the plurality of cooling baffles may be arranged as an array with at least a portion of one or more of the cooling surfaces coated with an adsorbent material. The array of cooling barrels may be oriented horizontally, vertically, arranged in a stack, or in any other combination. Each of the plurality of cooling baffles is attached to the second stage refrigerator directly or they are attached to a bracket, which is connected to the second stage refrigerator. The second stage array may also have a top plate coupled to the plurality of cooling baffles and arranged between the frontal baffle plate and the plurality of cooling baffles, the top plate being aligned with the plurality of cooling baffles and having a second projected area greater than the first projected area. The projected area of the top plate may be greater than 50%, and preferably approximately 90% of the frontal opening area of a radiation shield of the cryopump surrounding the second stage. However, the top plate may have any other area that is larger than the area of the cooling baffles, which is typically about 50% of the radiation shield.

Advantages of a cryopump having the large-area top plate described herein include increased capacity of condensed Type II gases before regeneration of the cryopump is needed. Another advantage of the large-area top plate is improved isolation of the adsorbent material from the Type II gases, preserving the adsorbent material for the Type III gases. The large-area top plate is particularly advantageous with the frontal baffle plate described above. The frontal baffle plate in combination with the large-area top plate allows less radiation from the process chamber to reach the second stage array of baffles than conventional frontal arrays that use sputter plates. The decreased radiation decreases the temperature of the array of the baffles/top plate, and particularly lowers the temperature of the baffle/top plate closest to the frontal baffle plate and the Type II condensed gas that is present on the baffle/top plate closest to the frontal baffle plate. The large-area top plate is capable of capturing a greater volume of condensed gases while maintaining an acceptable temperature of the surface of the condensed gas.

The frontal baffle plate may be replaced with concentric rings preferably angled at 10-60° and most preferably 35-45°.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 9 is a side view cross-section of a cryopump having an embodiment of a large-area top plate;

FIG. 15A is a side view cross-section of a cryopump having a frontal array of concentric rings and a large-area top plate; and FIG. 15B is a plan view of the frontal array of FIG. 15A.

DETAILED DESCRIPTION OF THE INVENTION

A description of example embodiments of the invention follows.

Figure 1A:
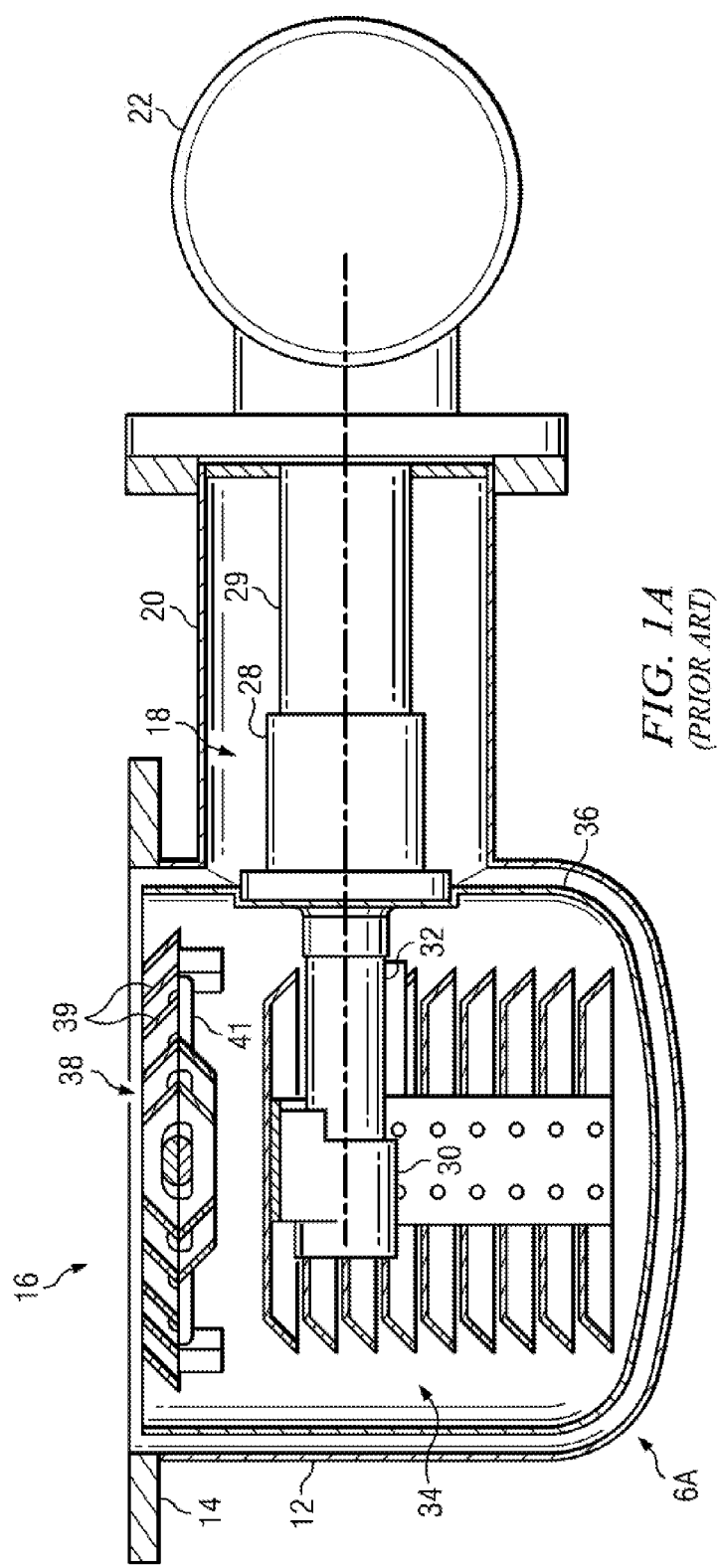
FIG. 1A is a side view cross-section of a prior art cryopump.
Figure 1B:
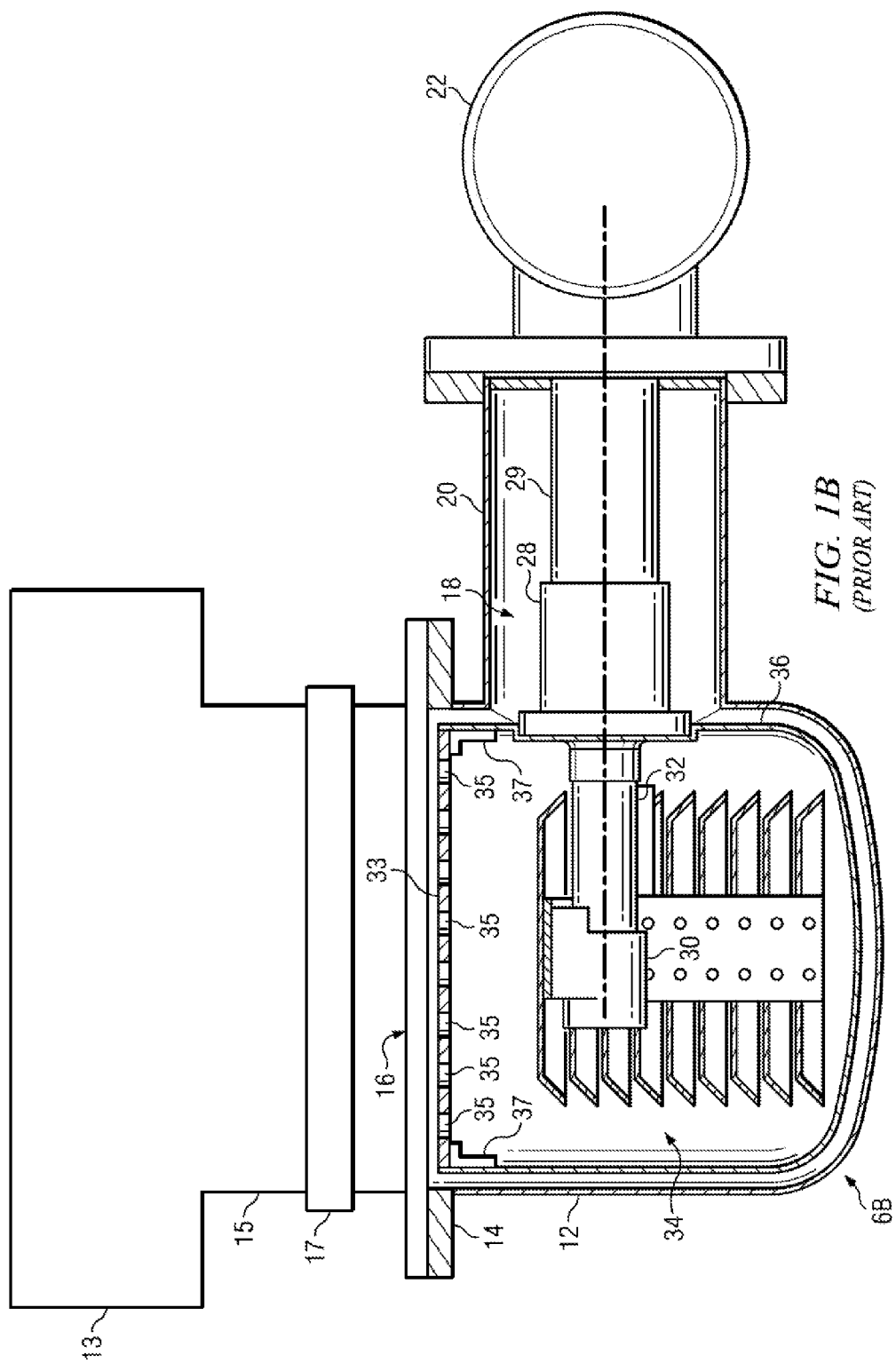
FIG. 1B is a side view cross-section of another prior art cryopump.

A cross-section side view of prior art circular cryopumps 6A and 6B attached to a process chamber 13 is shown in FIGS. 1A and 1B, respectively. The cryopumps 6A and 6B include a cryopump housing 12 which may be mounted either directly to the process chamber along flange 14 or to an intermediate gate valve 17 between it and the process conduit 15 which is connected to the process chamber 13. The conduit 15 includes a gate valve 17 which may be employed to isolate the cryopump 6 from the process chamber 13. The cryopumps 6A and 6B are capable of pumping the process chamber 13. The cryopumps 6A and 6B include a cryopump housing 12 bolted to conduit 15, which is coupled to the process chamber 13. The front opening 16 in the cryopump housing 12 communicates with the circular opening in the process chamber 13. A two stage cold finger 18 of a refrigerator protrudes into the cryopump housing 12 through a cylindrical portion 20 of the vessel. The refrigerator may be a Gifford-McMahon refrigerator as disclosed in U.S. Pat. No. 3,218,815 to Chellis et al. A two stage displacer in the cold finger 18 is driven by a motor 22. With each cycle, helium gas introduced into the cold finger under pressure is expanded and thus cooled and then exhausted through a line. A first stage heat sink or heat station 28 is mounted at the cold end of the first stage 29 of the refrigerator. Similarly, a heat sink 30 is mounted to the cold end of the second stage 32.

A primary pumping surface is an array of baffles 34 mounted to the second stage heat station 30. This array is preferably held at a temperature below 20 K in order to condense low condensing temperature gases. A cup-shaped radiation shield 36 is joined to the first stage heat station 28. The second stage 32 of the cold finger extends through an opening in the radiation shield. This shield surrounds the second stage array 34 to the rear and sides of the array to minimize heating of the array by radiation. Preferably, the temperature of this radiation shield is less than about 130 K.

FIG. 1A shows a frontal cryopanel array 38 that serves as both the radiation shield for the array of baffles 34 and as a cryopumping surface for higher boiling temperature gases such as water vapor. This array comprises louvers 39 joined by radial support rods 41. The supports rods 41 are mounted to the radiation shield 36. The radiation shield 36 both supports the frontal cryopanel array 38 and serves as the thermal path from the heat sink 28 to the frontal cryopanel array 38.

FIG. 1B shows an another frontal cryopanel design, which includes a frontal baffle plate 33 which is in thermal contact with the radiation shield 36, serving as both a radiation shield for the second stage pumping area and as a cryopumping surface for higher boiling temperature gases such as water vapor. The frontal baffle plate 33 is attached to the radiation shield 36 by brackets 37. The frontal baffle plate 33 has a plurality of orifices 35 which restrict flow of lower boiling point temperature gases to the second stage array.

The frontal baffle plate acts in a selective manner because it is held at a temperature approaching that of the first stage heat sink (between 50 K and 130 K). While the higher condensing temperature gases freeze on the baffle plate itself, the orifices 35 restrict passage of these lower condensing temperature gases to the second stage. As described above, by restricting flow to the inner second stage pumping area, a percentage of inert gases are allowed to remain in the working space to provide a moderate pressure (typically $10^{-3}$ Torr or greater) of inert gas for optimal sputtering. To summarize, of the gases arriving at the cryopump port 16, higher boiling temperature gases are removed from the environment by condensation on the frontal baffle plate while the flow of lower temperature gases to the second stage pumping surface is restricted. The flow restriction results in higher pressure in the working chamber.

Figure 2:
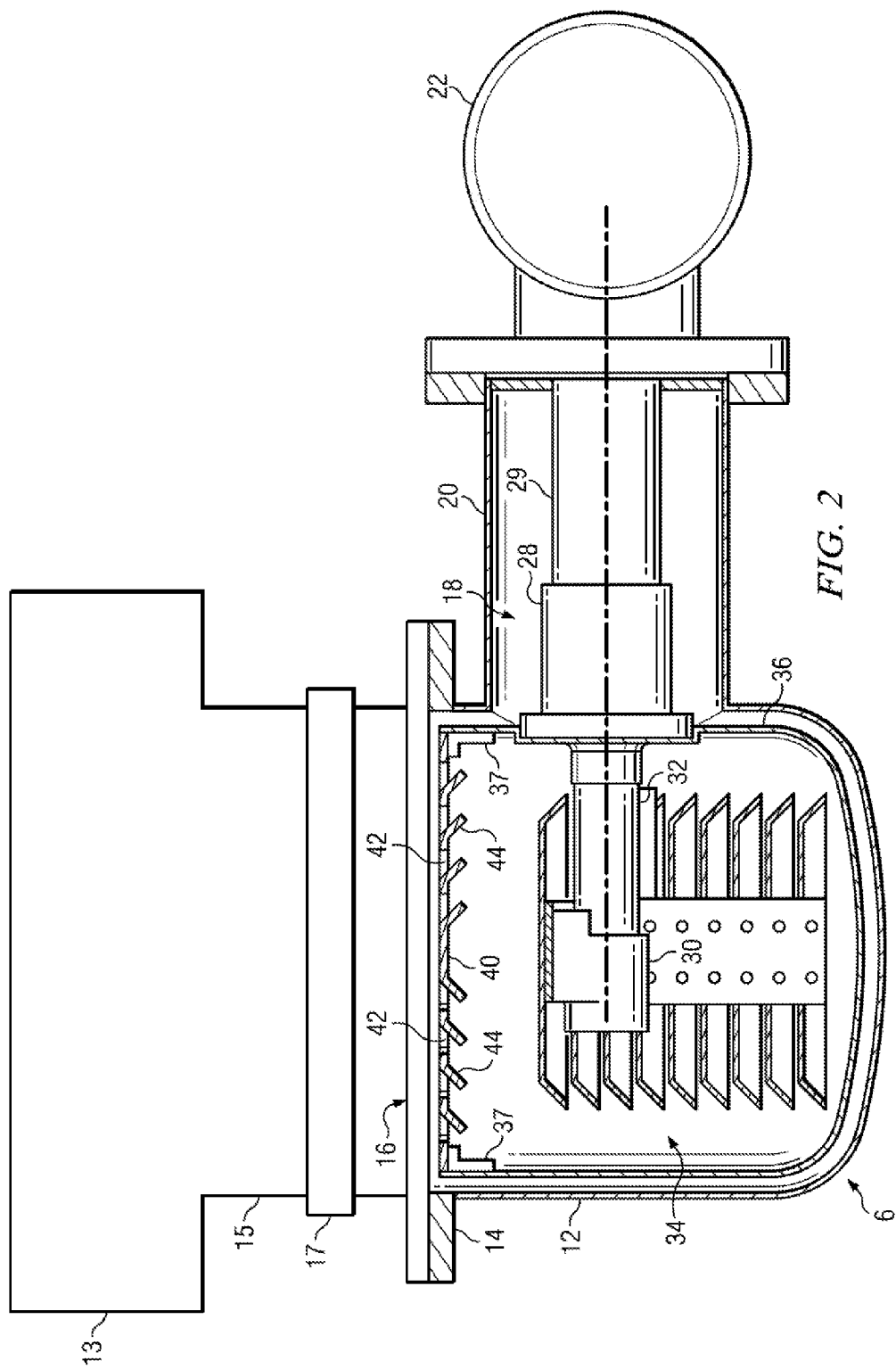
FIG. 2 is a side view cross-section of a cryopump having an embodiment of a frontal baffle plate.
Figure 3A:
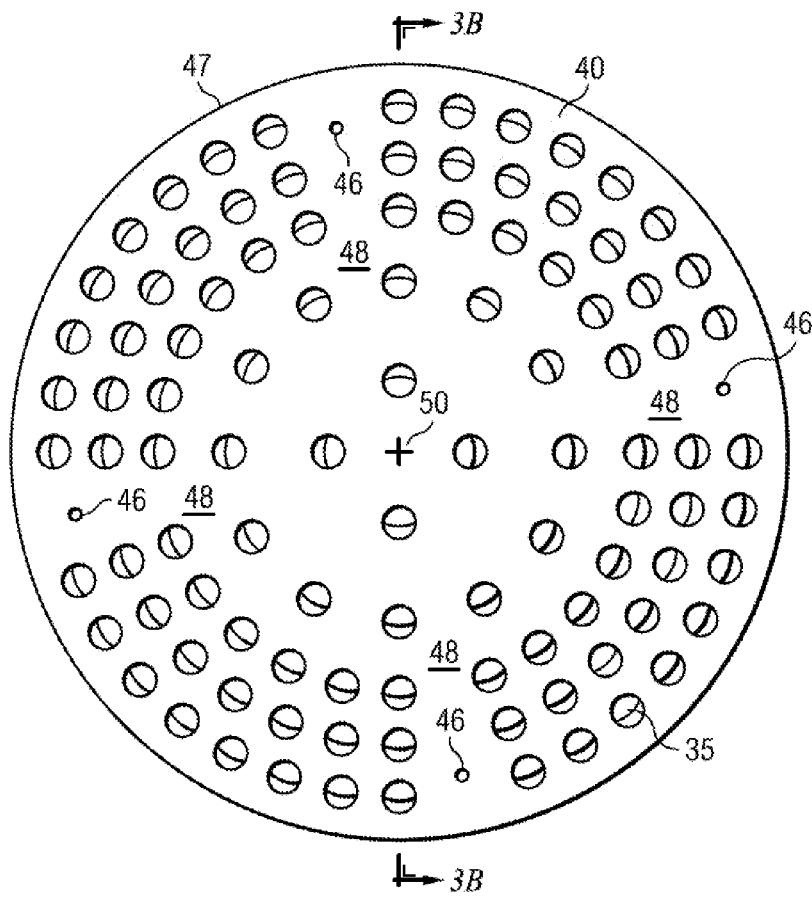
FIG. 3A is a top view of an embodiment of a frontal baffle plate having circular orifices.
Figure 3B:
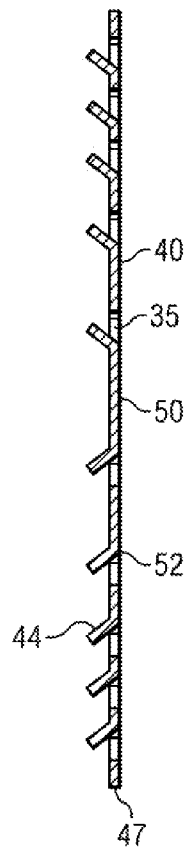
FIG. 3B is a side view cross-section of the embodiment of the frontal baffle plate shown in FIG. 3A.

FIG. 2 shows a circular cryopump 7 having an embodiment of a frontal baffle plate 40, and FIGS. 3A and 3B show the frontal baffle plate 40 isolated from the cryopump. The frontal baffle plate 40 has a plurality of orifices 42, each orifice 42 having a flap 44 associated with it. FIG. 3A shows a top view of the frontal baffle plate 40. The frontal baffle plate 40 carries a plurality of orifices 35. The frontal baffle plate 40 also may carry a plurality of holes 46 that can receive rivets, screws, or other fasteners (not shown) to attach the frontal baffle plate 40 to brackets 37. In the embodiment that is shown, the plurality of orifices 35 are arranged on the frontal baffle plate 40 in a pattern that provides regions 48 that have no orifices 35. These regions 48 allow for higher thermal conductance between the center 50 of the frontal baffle plate 40 and the holes 46 and the perimeter 47 of the frontal baffle plate 40. Generally, the frontal baffle plate 40 is thermally coupled to the radiation shield—at the brackets 37 via holes 46, and also may be coupled at the perimeter 47 where the frontal baffle plate 40 is in contact with the radiation shield 36. FIG. 2 shows the frontal baffle plate 40 nestled within the radiation shield 36. Alternatively, the frontal baffle plate 40 can be arranged on top of the radiation shield 36. FIG. 3B shows a side view cross-section of the frontal baffle plate 40 at section A-A shown in FIG. 3A. Each orifice 35 in the frontal baffle plate 40 has a flap 44. Each flap 44 is attached to the frontal baffle plate 40 at an edge 48 of its respective orifice 35.

Figure 3C:
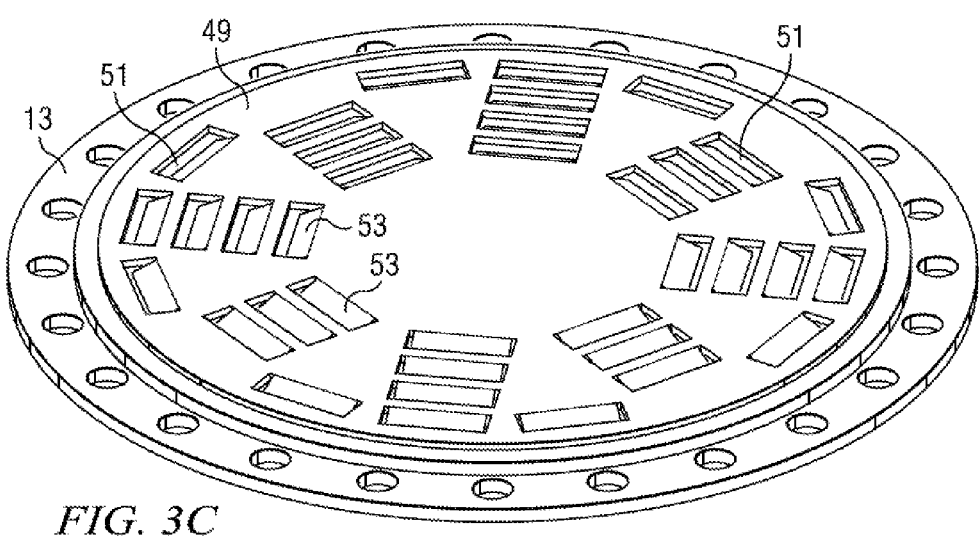
FIG. 3C is a top view of an embodiment of a frontal baffle plate having rectangular orifices.

FIG. 3C shows a perspective view of an alternate embodiment of a frontal baffle plate 49 for a circular cryopump having rectangular orifices 51. FIG. 3C shows the frontal baffle plate 49 from the side that faces a process chamber 13. Each rectangular orifice 51 has an associated flap 53 attached at a fold line 55. The fold line 55 for each orifice 51 is at an edge of the orifice closest to the center of the frontal baffle plate 49 such that an unblocked path from the process chamber 13 to the array of baffles 34, through the orifices 51, goes radially outward from the center of the frontal baffle plate. This radial outward path directs the relatively hot gas flow from the process chamber away from first striking the array of baffles 34, reducing the heat load on the array of baffles. The radial outward path also reduces the radiation load on the second stage array of baffles 34 because the radiation also is directed away from the array of baffles 34.

Generally, increasing the number of orifices 35 on the frontal baffle plate 40 and evenly distributing the orifices 35 on the frontal baffle plate 40 results in the Type II gases passing through the orifices 35 more evenly impinging on the array of baffles 34 in a cryopump. However, increasing the number of orifices 35 of a given size and evenly spacing the orifices 35 reduces the size of regions 48 without orifices 35, reducing the heat conductance of the frontal baffle plate 40, which can increase the temperature of the frontal baffle plate 40 in an operating cryopump. Also, increasing the number of orifices 35 may require smaller orifices 35, and smaller orifices 35 are more susceptible to being clogged by condensing gases.

Figure 4:
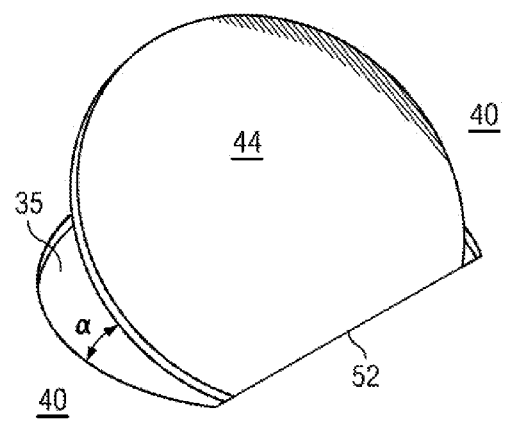
FIG. 4 is a perspective view of an orifice and flap in the embodiment of a frontal baffle plate shown in FIGS. 3A and 3B.

FIG. 4 is a perspective close-up view of a circular orifice 35 in the frontal baffle plate 40. Orifice 35 is surrounded by the frontal baffle plate 40. The flap 44 is attached to the frontal baffle plate 40 at fold line 52 and oriented at an angle α with respect to the frontal baffle plate 40. The angle α is preferably at an angle of between 10° and 60°, and is more preferably at an angle between 20° and 40°, and is most preferably at an angle of between 25° and 35°. Choosing the angle α is a compromise between blocking radiation (less angle α) and improving gas flow to the second stage (more angle α), and the ideal angle α may depend on the particular application and pumping needs.

Figure 5:
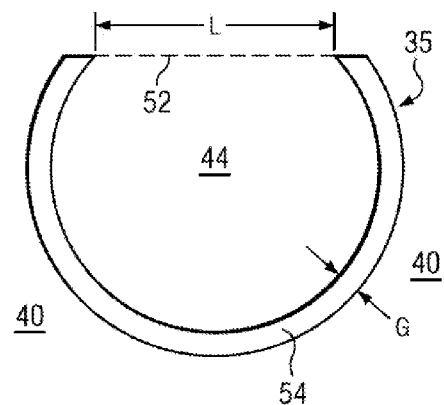
FIG. 5 is a top view of an orifice in the frontal baffle plate shown in FIGS. 3A, 3B, and 4.

FIG. 5 shows a top close-up view of the circular orifice 35 in the frontal baffle plate 40 before bending the flap 44. Typically, the orifice 35 is formed by cutting a gap 54 into the frontal baffle plate 40. The gap may be formed using any removal means, including, but not limited to, laser cutting, water jet cutting, etching, and mechanical cutting. The gap 54 defines the edges of orifice 35, except that gap 54 does not continue completely around the edges of the orifice 35. The fold line 52 attached to the flap 44, the fold line 52 having a length L, completes the edges of the orifice 35. The gap 54 has a width G. Radiation from the working chamber 13 passing through the orifice 35 will be blocked by the flap 44, except that some radiation will pass through the gap 54 to reach the array of baffles 34. Thus, it is desirable to minimize the width G of the gap 54. It is possible to have zero width G to the gap 54 by creating the orifices 35, for example, by stamping, in which case the flap 44 is created by shearing it from the frontal baffle plate 40. However, stamping generally requires tooling that is expensive to make and cannot accommodate changes, e.g., different orifice sizes, shapes, or patterns, without ordering new stamp tooling. Laser cutting methods can create gaps as small as 0.020 inches.

In one embodiment, the circular orifice has a diameter of one-half of an inch. In general, the larger the total area of the holes in the frontal baffle plate, the greater the conductance of gas through the plate. Many smaller holes allows for more uniform distribution of gases on the second stage. However, holes should not be so small as to clog with condensed gases. Circular orifices may, for example, have diameters in the range of 0.25 inches to 1 inch.

Figure 6:
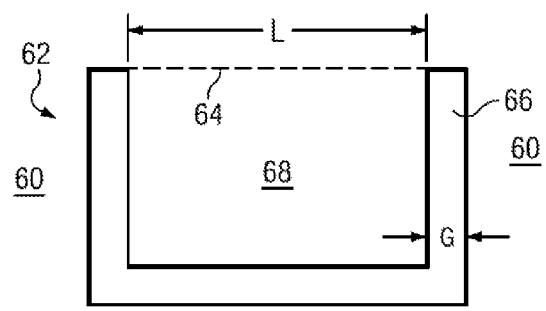
FIG. 6 is a top view of a rectangular orifice in a frontal baffle plate.

FIG. 6 shows a top close-up view of a rectangular orifice 62 in a frontal baffle plate 60. The rectangular orifice 62 has a gap 66, which defines the edges of the orifice 62, except that the gap 66 does not continue completely around the edges of the orifice 62. The fold line 64 attached to flap 68, the fold line 64 having a length L, completes the edges of the orifice 62. It is preferable for the fold line 64 to be arranged on the longest dimension of the rectangular orifice 62. For example, in one embodiment, the rectangular orifice 62 has dimensions of one-half inch in length by one inch in length, and the fold line 64 preferably is arranged on the one-inch length side. The dimensions of the rectangular orifices may range from having length to width ratios of 1:1 to 5:1. Advantages of the rectangular orifice include ease of manufacturability and improved heat conductance (compared to a circular orifice) between the flap 68 and the frontal baffle plate 60 for a given orifice 62 size. Heat conductance is improved because the length L of the fold line 64 is larger on a rectangular orifice than on a comparably sized circular orifice.

Figure 7:
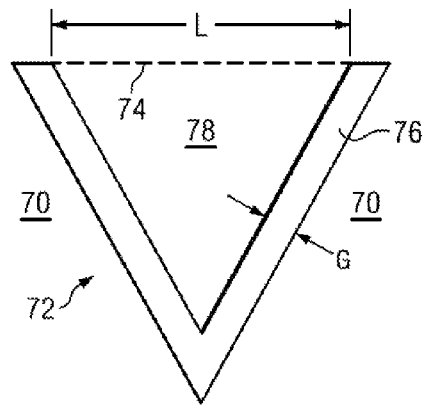
FIG. 7 is a top view of a triangular orifice in a frontal baffle plate.

FIG. 6 shows a top close-up view of a triangle-shaped orifice 72 in a frontal baffle plate 70. The triangle-shaped orifice 72 may be shaped like an equilateral triangle or like an isosceles triangle. The triangle-shaped orifice 72 has a gap 76, which defines the edges of the triangle-shaped orifice 72, except that the gap 76 does not continue completely around the edges of the triangle-shaped orifice 72. A fold line 74 attached to flap 78, the fold line 74 having a length L, completes the edges of the orifice 72. Again, it is preferable for the fold line 74 to be arranged on the longest dimension of the triangular orifice 74. If the triangle-shaped orifice 72 is shaped like an equilateral triangle, then the fold line 74 may be located on any edge of the orifice 72. However, if the triangle-shaped orifice 72 is shaped like an isosceles triangle, it may be preferable to arrange the fold line 74 on the shorter, unequal-length edge of the orifice 72 to keep the fold symmetric with respect to remaining edges. FIGS. 5-7 merely show example shapes for orifices in a frontal baffle plate. Other shapes also may be used. The orifices 42 in FIG. 2 may include orifices of any of these shapes, and the orifices 42 may include a mix of different shapes.

Figure 8B:
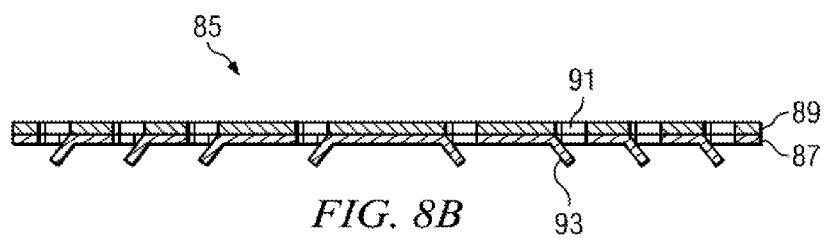
FIG. 8B is a side view cross-section of a frontal baffle plate.
Figure 8A:
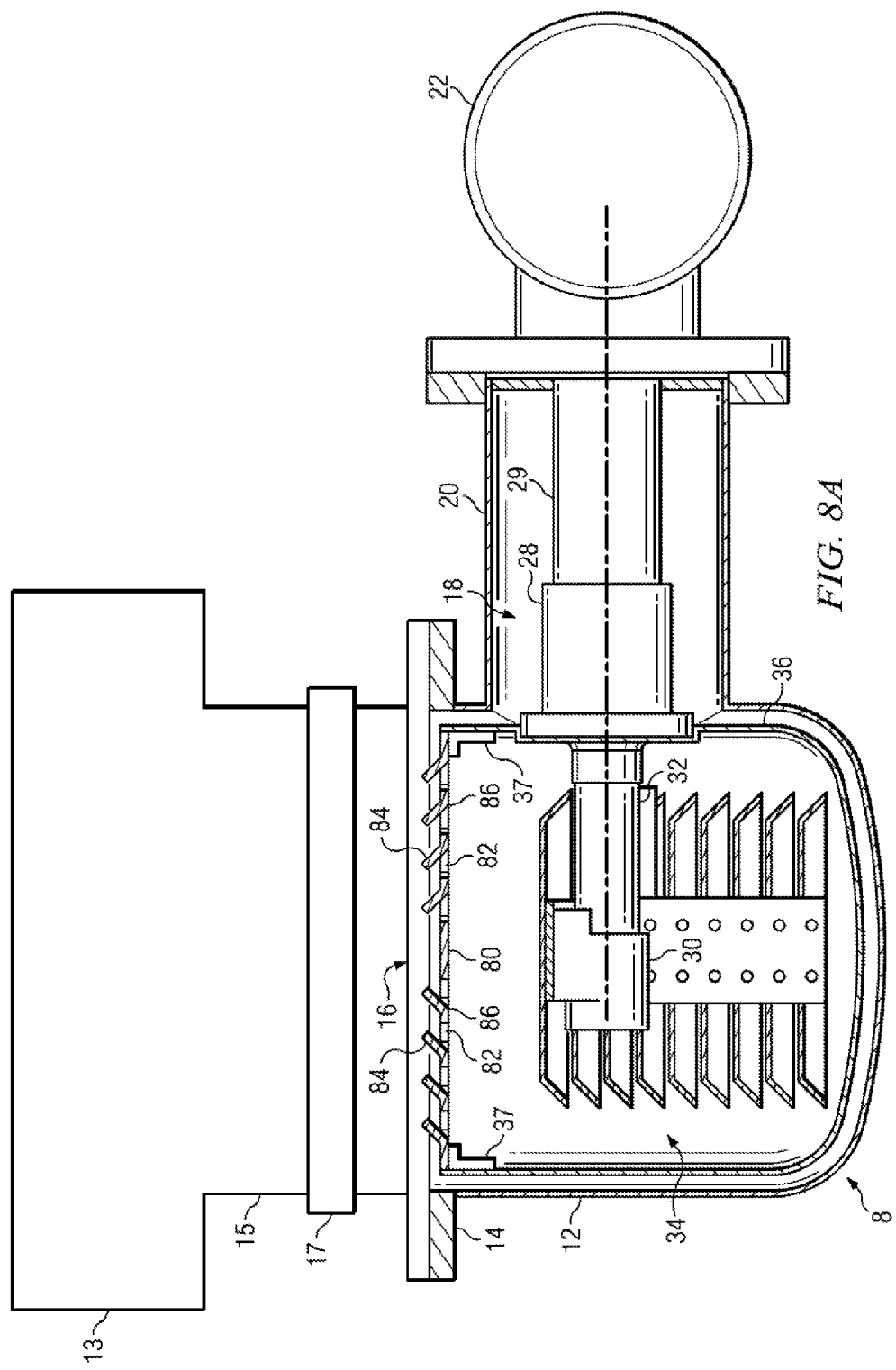
FIG. 8A is a side view cross-section of a cryopump having another embodiment of a frontal baffle plate.

FIG. 8A shows another embodiment of a cryopump 8 having a frontal baffle plate 80 with a plurality of orifices 82. In this embodiment, flaps 84 are arranged such that they are pointing towards the process chamber 13 and away from the second stage array 34. Like FIG. 2, the orifices 82 may include orifices of any shape, and may include a mix of different shapes. A person may orient a frontal baffle plate 80 with flaps facing the process chamber 13 when there is more room on the side of the work chamber 13 than on the side of the second stage array 34. Again, the flaps are oriented to direct flow away from the second stage.

FIG. 8B shows another embodiment of a frontal baffle plate 85 with a plurality of orifices 91. The frontal baffle plate 85 includes multiple layers 87, 89 that are stacked and bonded together. Layer 87 includes orifices 91 and flaps 93 as described above with respect to FIGS. 3-7. Layer 89 includes orifices 91 but does not include the flaps 93. FIG. 8B shows only two layers 87, 89. However, a frontal baffle plate may be formed of more than two layers. The multiple layers may be bonded together by any means, including but not limited to welding, soldering, rivets, screws, bolts, and adhesives.

FIG. 9 shows an embodiment of a cryopump 9 having a large-area top plate 90 that may be positioned on top of or, as shown, replaces the top-most baffle of the second stage array of baffles 34. The large-area top plate 90 results in a smaller gap 92 between itself and the radiation shield 36 than the gap 94 between the remaining baffles of the array of baffles 34 and the radiation shield 36. The large-area top plate 90 reduces the thickness of condensed gas for a given quantity of pumped Type II gas, which results in a smaller temperature differential across the thickness of the condensed material during pumping and also reduces the amount of time required between work cycles to return to a baseline temperature as described below. The large-area top plate 90 also will allow more Type II gas to be pumped because, with the same thickness of condensed gas, the total volume of condensed gas will increase as a result of the larger area. The large-area top plate 90 reduces the amount of Type II gases that reach the remaining baffles of the array of baffles 34 and the adsorbent material (not shown) on the undersides of the remaining baffles.

Figure 10:
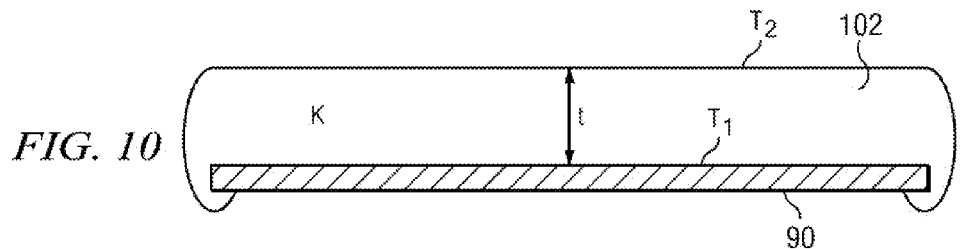
FIG. 10 is a side view cross-section of the large-area top plate shown in FIG. 9.

FIG. 10 shows a side-view cross section of a circular large-area top plate 90 of the second stage array and a layer of condensed gases 102 built up on it. The condensed gases are comprised of condensed Type II gases. As described above, certain gases from the process chamber 13 pass through the frontal baffle plate and are condensed on the top plate 90 of the second stage array. These gases condense into a layer 102 having thickness t, and the gases have a thermal conductivity coefficient K. As described above, the large-area top plate 90 is maintained at a very low temperature $T_1$. The temperature at the surface of the condensed gases 102 will be a different temperature $T_2$ that is warmer than $T_1$. When the work chamber is idle and no additional gases are being added to the cryopump, $T_2$ eventually will drop to be equal (or very nearly equal) to $T_1$. However, when new gases are introduced into the cryopump from the work chamber and condense on top of the already condensed gases 102, $T_2$ is higher than $T_1$. The difference between $T_2$ and $T_1$ is a function of the thickness t of the condensed gases 102, the thermal conductivity K of the condensed gases 102, and the temperature and rate of arrival of the incoming gases that condense on the plate 90. The thicker the layer of condensed gases 102 is, the longer it takes for $T_2$ to return to $T_1$ after a work cycle in the process chamber 13. If $T_2$ is above a threshold temperature, then the cryopump cannot effectively pump gases from the work chamber, and the longer the period during which $T_2$ is above the threshold temperature, the longer the period in which the work chamber 13 cannot be used. Thus, the amount of time required for $T_2$ to drop below the threshold level after receiving gases from the work chamber is a factor used to determine when to regenerate the cryopump. Minimizing the thickness of the condensed gases 102 therefore is beneficial for maximizing the amount of time between regeneration cycles.

Figure 11A:
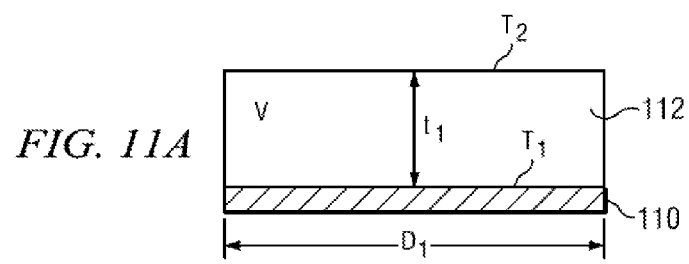
FIG. 11A is a side view cross-section of a second stage top plate.
Figure 11B:
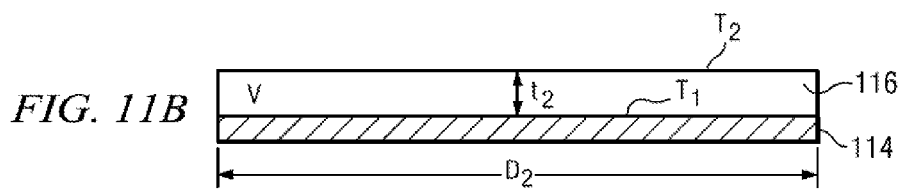
FIG. 11B is a side view cross-section of a second stage large-area top plate.

FIGS. 11A and 11B illustrate how the large-area top plate 90 minimizes the thickness of the condensed gases 102. First, for a cylindrical plate such as that shown in FIGS. 11A and 11B, notice that the condensed gases 102 form an approximately cylindrical volume (ignoring the slightly rounded sides and the condensed gases wrapped onto the opposite side of the large-diameter top plate 90). FIG. 11A shows a side view cross-section of a circular top plate 110 having a small diameter $D_1$. The plate 110 is a representation of the top baffle from the array of baffles 34. For simplicity, the angled edges shown in the array of baffles 34 are ignored. The top plate 110 has a layer of condensed gases 112 on top of it. The condensed gases 112 have a volume V and are in the shape of a cylinder. FIG. 11B shows a side view cross-section of a circular large-area top plate 114 having a large diameter $D_2$, where $D_2$ is larger than $D_1$. The large-area top plate 114 has a layer of condensed gases 116 on top of it. The condensed gases 116 have the same volume V as the condensed gases 112 on plate 110. However, the thickness $t_2$ of the condensed gases 116 is less than the thickness $t_1$ of the condensed gases 112 on the plate 110 of FIG. 11A. The volume of a cylinder is $\pi D^2/4$ multiplied by the thickness t. Thus, increasing the diameter of the plate from $D_1$ to $D_2$ means that an equivalent volume V of condensed gases 112 and 116 has its thickness reduced from $t_1$ to $t_2$. The large-area top plate 114 therefore can return $T_2$ to $T_1$ faster than plate 110 for an equivalent volume of frost. Also, the large-area top plate 114 can reduce $T_2$ to $T_1$ in an acceptable amount of time with more condensed gases accumulated on it than can plate 110. Also, because the difference between $T_1$ and $T_2$ is smaller for a given volume of condensed gas 116, the temperature $T_1$ of the large-area top plate 114 can be higher than the temperature $T_1$ of the small top plate 110 while still maintaining an acceptable temperature $T_2$ of the condensed gas 116.

Returning to FIG. 9, the large-area top plate 90 also improves the cryopump by capturing more of the Type II gases, preventing those Type II gases from reaching the remaining baffles in the array of baffles 34 and the adsorbent material (not shown) on some or all of the remaining baffles. Type II gases will condense on the adsorbent material, but such condensation reduces the capacity of the adsorbent material to adsorb Type III gases. It is preferable for the Type II gases to condense on the large-area top plate 90 to save the adsorbent material for the Type III gases. The large-area top plate 90 provides a smaller gap 92 between edges of the large-area top plate 90 and the radiation shield 36 than the gap 94 between the remaining baffles of the array of baffles 34 and the radiation shield 36. The smaller gap 92 reduces the amount of Type II gases that pass between the large-area top plate 90 and the radiation shield 36. However, the smaller gap also slows the movement of Type III gases that reach the adsorbent material on the remaining baffles in the array of baffles 34, thereby reducing the pumping speed of those gases. Also, the larger surface area of the large-area top plate 90 makes the large-area top plate 90 more susceptible to radiation from the work chamber. Increasing the radiation exposure of the large-area top plate 90 increases the heat load on the large-area top plate 90 and thus the second stage.

In one embodiment of a circular cryopump according to the present invention, the diameter $D_2$ of the circular large-area top plate 90 is 6.5 inches and the diameter $D_1$ of remaining baffles in the array of baffles 34 is 5.28 inches. In a test of such a configuration, it was found that pumping speeds of Type III gases was reduced by approximately 12%. However, other diameters also are possible. A circular large-area top plate 90 may have any diameter that is larger than the diameter of the array of baffles 34 while leaving a gap between the plate and the radiation shield 36 to provide adequate pumping speed of Type III gases. The array of baffles 34 typically has a diameter that is approximately 70% of the diameter of the radiation shield 36. The large-area top plate 90 may have a diameter between approximately 70% and 98% of the diameter of the radiation shield 36. For a non-circular cryopump, the large top plate has a cross-sectional area between 50% and 95% of the cross sectional area of the radiation shield. Preferably, the top plate projected area will be 73% to 90% of the frontal open area of the radiation shield. The top plate may support adsorbent on its bottom surface.

Figure 12:
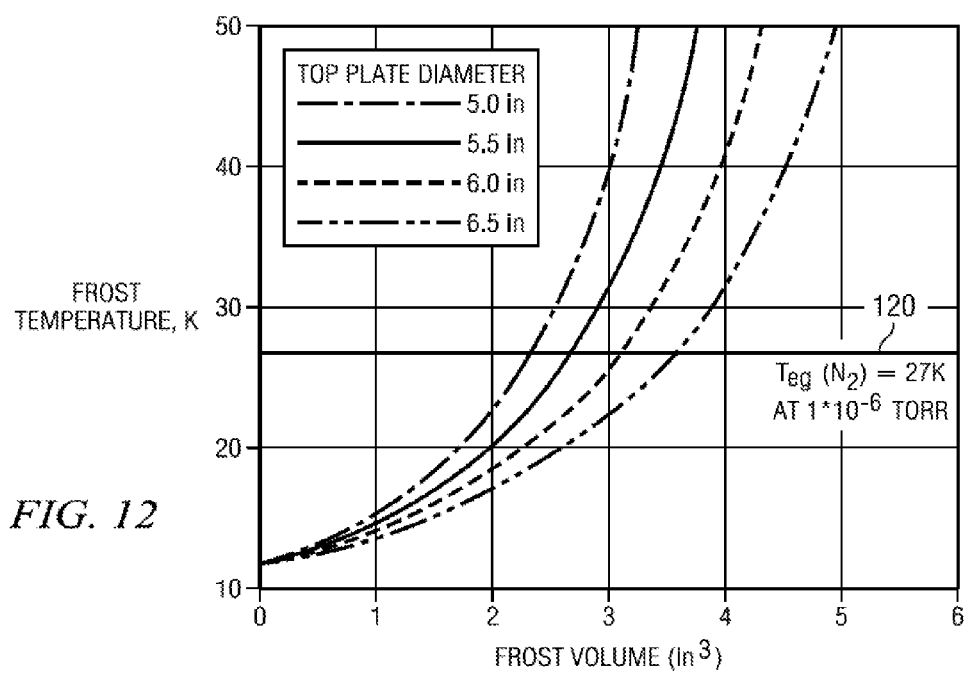
FIG. 12 is a chart showing condensed gas capacity of various large-area top plates having different diameters.

FIG. 12 is a graph that shows test results for various sizes of a large-area top plate for a particular circular cryopump. The graph shows the surface temperature of condensed gases ("frost") as the volume of the condensed gases increases. For the particular cryopump used in the test, the threshold temperature 120 for the surface temperature of the condensed gases is 27 K—higher temperatures would be unacceptable and would require that the cryopump be regenerated. The graph shows that larger area top plates can hold larger volumes of condensed gases while maintaining a temperature below the threshold temperature 120. For example, a circular large-area top plate with a diameter of 5.0 inches 1 can accumulate approximately 2.3 in$^3$ of condensed gases before the surface temperature of the condensed gases exceeds the threshold temperature 120. In another example, a circular large-area top plate with a diameter of 5.5 inches 2 can accumulate approximately 2.7 in$^3$ of condensed gases before the surface temperature of the condensed gases exceeds the threshold temperature 120. In yet another example, a circular large-area top plate with a diameter of 6.0 inches 3 can accumulate approximately 3.1 in$^3$ of condensed gases before the surface temperature of the condensed gases exceeds the threshold temperature 120. In a fourth example, a circular large-area top plate with a diameter of 6.5 inches 4 can accumulate approximately 2.6 in$^3$ of condensed gases before the surface temperature of the condensed gases exceeds the threshold temperature 120.

Figure 13:
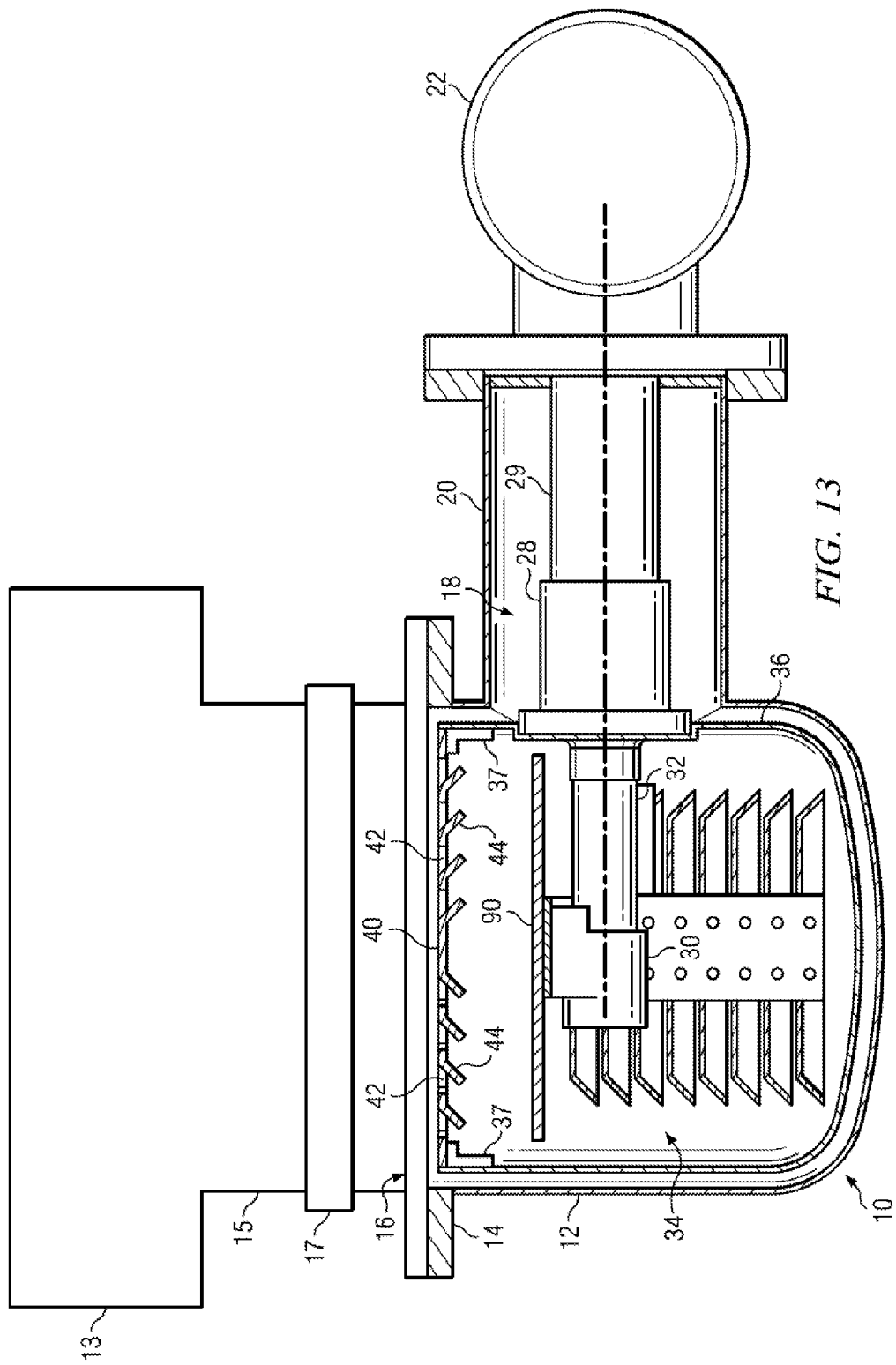
FIG. 13 is a side-view cross-section of a cryopump having an embodiment of a frontal baffle plate in combination with an embodiment of a large-area top plate.

FIG. 13 shows a side-view cross-section of a cryopump 10 incorporating both the frontal baffle plate 40, such as those described above in FIGS. 3-8, and a large-area top plate 90, such as a plate described in FIGS. 9-11. The combination of the frontal baffle plate 40 and the large-area top plate 90 is beneficial. The frontal baffle plate 40 allows less radiation from the process chamber 13 to reach the second stage array of baffles 34 and top plate 90 than conventional frontal arrays that use sputter plates. The decreased radiation decreases the temperature of the array of baffles 34, and particularly lowers the temperature of the baffle/top plate 90 closest to the frontal baffle plate 40. As explained above, the large-area top plate 90 is capable of capturing a greater volume of condensed gases and maintaining an acceptable temperature.

Figure 14:
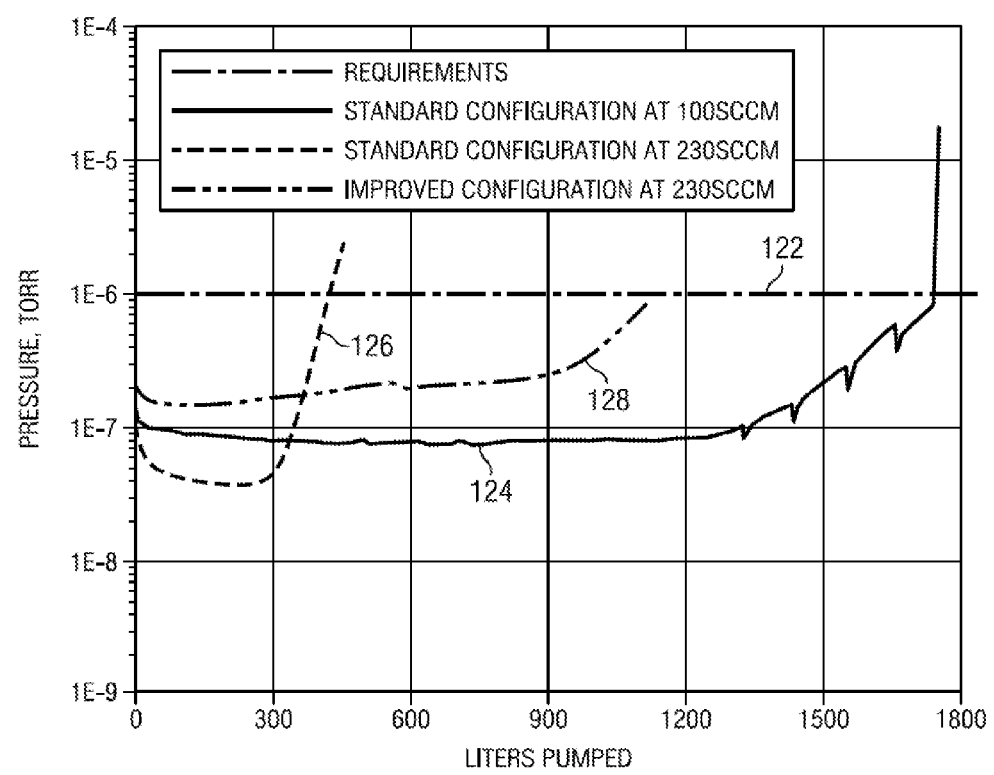
FIG. 14 is a chart showing pumping capacity of various cryopump configurations.

FIG. 14 is a chart that shows the advantages of a cryopump 10 incorporating both the frontal baffle plate 40 and the large-area top plate 90. FIG. 14 shows test results of the vacuum a cryopump is capable of maintaining at various flow rates as a function of the total volume already pumped. For the cryopump used in testing, a threshold pressure 122 of 1×10$^{-6}$ Torr must not be exceeded. If the cryopump cannot maintain a pressure below the threshold pressure 122, then the cryopump needs to be regenerated. The chart shows that a standard cryopump, such as the cryopump shown in FIG. 1, that is pumping gas at a rate of 100 standard cubic centimeters per minute ("sccm") 124, can pump approximately 1750 liters before it cannot maintain a pressure below the threshold pressure 122. By contrast, the standard cryopump pumping gas at a rate of 230 sccm 126, only can pump approximately 420 liters of gas before it cannot maintain a pressure below the threshold pressure 122. A cryopump 10 incorporating both the frontal baffle plate 40 and the large-area top plate 90, which is pumping at 230 sccm 128, can pump in excess of 1,100 liters before it cannot maintain a pressure below the threshold pressure 122. A cryopump having only one of the frontal baffle plate 40 and large-area top plate 90 would present results between the two 126 and 128 illustrated at 230 sccm.

FIGS. 15A and 15B illustrate yet another embodiment of the invention utilizing the large-area top plate 90. In this embodiment, the frontal array comprises concentric rings 130 supported on rods 132 and 134 that are coupled to the wall of the radiation shield. Although the concentric rings might include chevrons as illustrated in FIG. 1, in order to increase speed, each ring is a frustoconical ring that angles in only one direction. Preferred angles are in the range of 10-60°, but more preferably in the range of 35-45°. The selection of angle is a tradeoff between speed and radiation heat load on the second stage. Preferably, the outer diameter of each ring is about the same as or just larger than the inner diameter of the next larger ring. Although the rings are shown supported by the side walls of the radiation shield, they may be supported by longitudinally extending struts that extend to the base of the radiation shield.

In other embodiments, the cryopump having the frontal baffle array and/or large top plate, described above, may be non-round in shape. Examples of such non-round cryopumps are described in U.S. Pat. No. 6,155,059, the contents of which are incorporated by reference in their entirety. For a rectangular cryopump, the large top plate preferably would cover 50% to 98% of the cross-sectional area of the radiation shield. In other embodiments, the cryopump having the frontal baffle array and/or large top plate, described above, may be an in situ cryopump or an appendage pump. Examples of such in situ cryopumps and appendage cryopumps are described in Patent Cooperation Treaty Application No. PCT/US2009/065168, the contents of which are incorporated by reference in their entirety.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A cryopump comprising:
a two stage refrigerator;
a radiation shield having a frontal open area, the radiation shield thermally coupled to a first stage of the refrigerator,
a first stage frontal cryopanel across the frontal open area and cooled by the first stage;
a second stage within the radiation shield having:
a plurality of cooling baffles arranged as an array of cooling baffles along an axis of the radiation shield that extends through the frontal open area, the plurality of cooling baffles thermally coupled directly to a second stage of the refrigerator, at least a portion of at least one cooling surface coated with an adsorbent material; and
a top plate thermally coupled to the second stage of the refrigerator and arranged between the first stage frontal cryopanel and the plurality of cooling baffles, the top plate extending substantially beyond the plurality of cooling baffles as viewed from the frontal cryopanel.

2. The cryopump of claim 1 wherein the top plate extends beyond the plurality of cooling baffles to cover between 50% and 98% of the frontal open area of the radiation shield of the cryopump.

3. The cyropump of claim 1 wherein the frontal cryopanel comprises angled baffles.

4. The cryopump as claimed in claim 3 wherein the angled baffles comprise rings supported by the radiation shield.

5. The cryopump as claimed in claim 4 wherein the rings angle radially outward from the front of the shield.

6. The cryopump as claimed in claim 5 wherein the rings are angled in the range of about 10-60° from a frontal plane of the frontal cryopanel.

7. The cryopump as claimed in claim 5 wherein the rings are angled in the range of about 25-35° from a frontal plane of the frontal cryopanel.

8. The cryopump as claimed in claim 5 wherein the rings are angled in the range of about 35-45° from a frontal plane of the frontal cryopanel.

9. The cryopump of claim 1 wherein the top plate extends substantially beyond the plurality of cooling baffles to cover between 73% and 95% of the frontal open area of a radiation shield of the cryopump.

10. The cryopump of claim 1 wherein the top plate extends beyond the plurality of cooling baffles to cover between 73% and 90% of the frontal open area of a radiation shield of the cryopump.

11. The cryopump of claim 10 wherein the plurality of cooling baffles have a projected area of about 50% of the frontal open area.

12. The cryopump of claim 1 wherein the top plate covers an area 46%-80% greater than the projected area of the plurality of cooling baffles.

13. A second stage array for a cryopump, comprising:
a plurality of cooling baffles, the plurality of cooling baffles arranged as an array of cooling baffles along an axis and configured to be thermally coupled directly to a second stage of a refrigerator, at least a portion of at least one cooling surface coated with an adsorbent material; and
a top plate configured to be thermally coupled to the second stage of the refrigerator and arranged to be between a frontal cryopanel and the plurality of cooling baffles, the top plate extending substantially beyond the plurality of cooling baffles as viewed from the frontal cryopanel.

14. The second stage for a cryopump of claim 13 wherein the top plate extends beyond the cooling baffles to cover between 50% and 98% of a cross-sectional area of a radiation shield of the cryopump.

15. The second stage array for a cryopump of claim 13 wherein the top plate extends substantially beyond the cooling baffles to cover between 73% and 95% of a frontal open area of a radiation shield of the cryopump.

16. The second stage array for a cryopump of claim 13 wherein the top plate extends substantially beyond the cooling baffles to cover between 73% and 90% of a frontal open area of a radiation shield of the cryopump.

17. The second stage array for a cryopump of claim 16 wherein the plurality of cooling baffles have projected area of about 50% of the frontal open area.

18. The second stage array for a cryopump of claim 13 wherein the top plate covers an area 46%-80% greater than the projected area of the plurality of cooling baffles.

* * * * *